US012479290B2

(12) United States Patent
Nakashima et al.

(10) Patent No.: US 12,479,290 B2
(45) Date of Patent: Nov. 25, 2025

(54) OFF-ROAD VEHICLE

(71) Applicant: Kawasaki Motors, Ltd., Hyogo (JP)

(72) Inventors: Yusuke Nakashima, Akashi (JP); Yumi Miyake, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 497 days.

(21) Appl. No.: 17/938,969

(22) Filed: Sep. 7, 2022

(65) Prior Publication Data

US 2024/0075808 A1 Mar. 7, 2024

(51) Int. Cl.
*B60K 15/063* (2006.01)
*B60R 7/04* (2006.01)

(52) U.S. Cl.
CPC ............ *B60K 15/063* (2013.01); *B60R 7/043* (2013.01); *B60K 2015/0632* (2013.01)

(58) Field of Classification Search
CPC ...................................................... B60R 7/043
See application file for complete search history.

(56) References Cited

U.S. PATENT DOCUMENTS 9,016,749 B2 * 4/2015 Mueller ............... B60N 2/3047 296/37.14
10,343,562 B2 * 7/2019 Dry .......................... B60N 2/32
10,710,509 B2 * 7/2020 Rowland ................. B60R 7/043
11,577,797 B2 * 2/2023 Yamamoto ............... B60N 2/02
11,926,248 B2 * 3/2024 Bonk ................... B60N 2/3065
2008/0308334 A1 * 12/2008 Leonard ................. B60K 37/00 180/90
2016/0193949 A1 * 7/2016 Pywell ................... B60N 3/104 297/188.1
2016/0280142 A1 * 9/2016 Yamamoto .............. B60R 7/043
2018/0222395 A1 8/2018 Roy et al.
2019/0061518 A1 * 2/2019 Hayashi ........... B60K 15/03504
2019/0152358 A1 * 5/2019 Kawakami ........... B60N 2/3013
2024/0217395 A1 * 7/2024 Chavez Vazquez ..... B60N 2/01

FOREIGN PATENT DOCUMENTS

EP 0937605 A1 * 2/1999

* cited by examiner

*Primary Examiner* — Alentin Neacsu
*Assistant Examiner* — Hosam Shabara
(74) *Attorney, Agent, or Firm* — XSENSUS LLP

(57) ABSTRACT

An off-road vehicle includes a seat located adjacent to an entrance in a vehicle compartment, and a storage located below the seat and having a housing space therein. The storage has an access opening opened to the entrance such that the housing space is accessible from the entrance.

9 Claims, 5 Drawing Sheets

OFF-ROAD VEHICLE

FIELD

The technique disclosed herein relates to an off-road vehicle.

BACKGROUND

Patent Document 1 (U.S. Patent Application Publication No. 2018/0222395) discloses an off-road vehicle including a storage container. The storage container is located below a seat provided in a vehicle compartment. The storage container has a container body and a lid rotatably attached to the container body. After the seat has been rotated upward, the lid is opened. In this manner, an access to the inside of the container body can be made.

SUMMARY

The seat needs to be rotated every time goods are taken in or out of the above-described storage container, and it takes time and effort.

The technique disclosed herein has been made in view of the above-described point, and an object thereof is to easily use a storage.

The off-road vehicle disclosed herein includes a seat located adjacent to an entrance in a vehicle compartment, and a storage located below the seat and having a housing space therein. The storage has an access opening opened to the entrance such that the housing space is accessible from the entrance.

DESCRIPTION OF EMBODIMENTS

Figure 1:
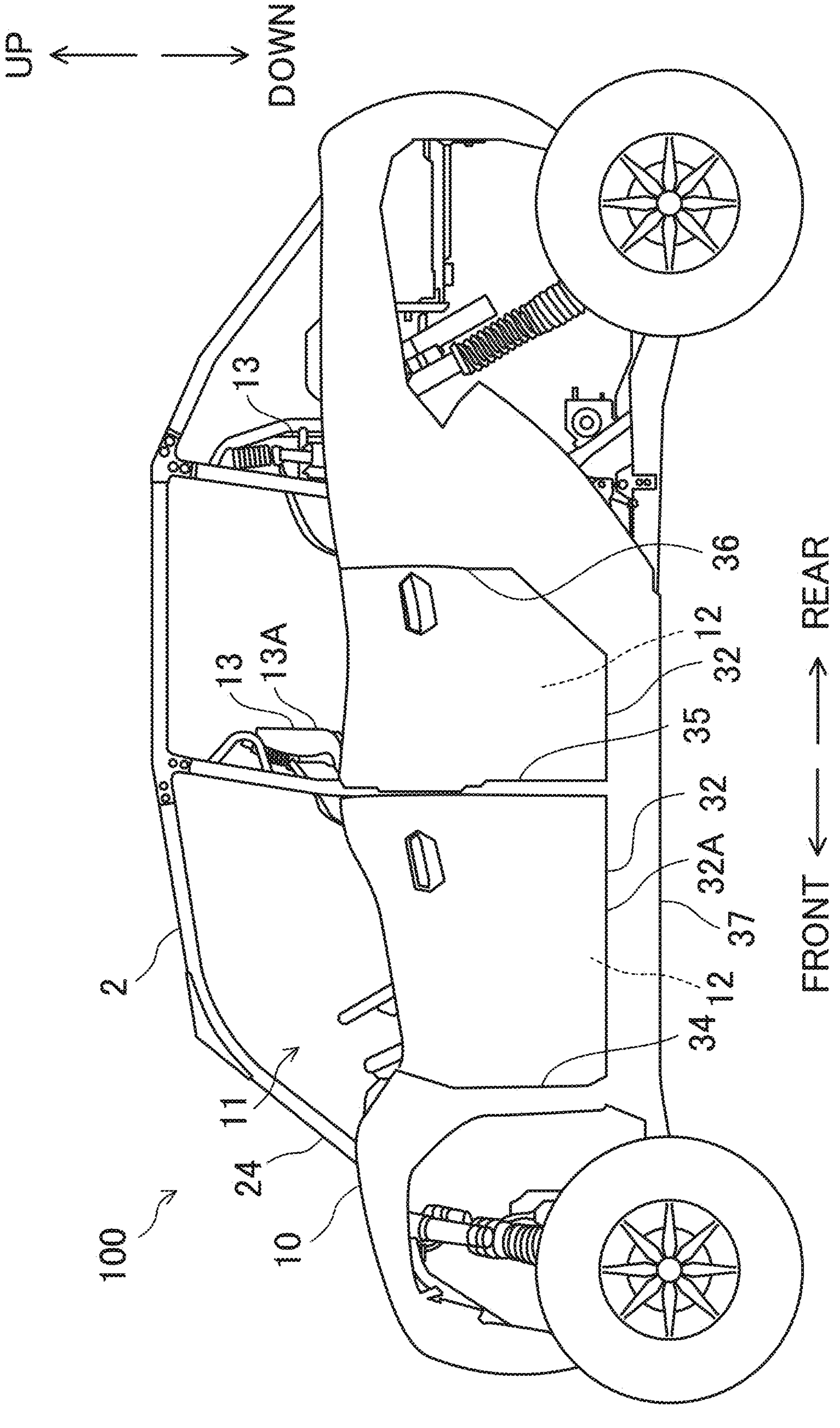
FIG. 1 is a side view of a utility vehicle.
Figure 2:
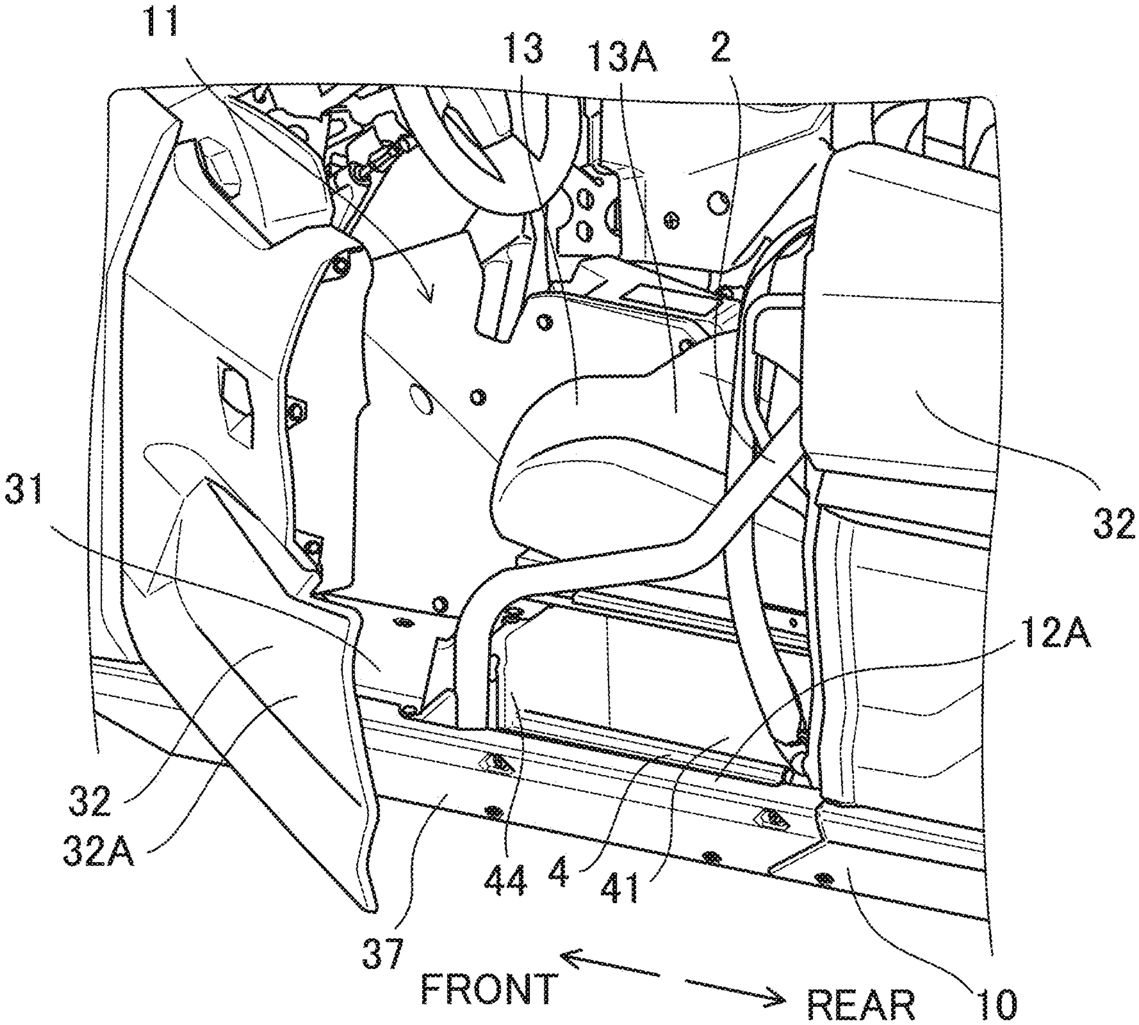
FIG. 2 is a perspective view of part of the utility vehicle with a door opened.

Hereinafter, an exemplary embodiment will be described in detail based on the drawings. FIG. 1 is a side view of a utility vehicle 100. FIG. 2 is a perspective view of part of the utility vehicle 100 with a door 32 opened. The utility vehicle 100 can travel off rod. The utility vehicle 100 is one example of an off-road vehicle. Note that unless otherwise specified, each element of the utility vehicle 100 will be described using a direction with reference to the utility vehicle 100 in the present disclosure. Specifically, a "front" means the front of the utility vehicle 100. The same also applies to a "rear," a "left," a "right," an "upper," and a "lower." Note that the right-left direction will be also referred to as a vehicle width direction.

The utility vehicle 100 is a four-wheeled automobile. The utility vehicle 100 includes a vehicle body 10, seats 13, and a storage 4. A vehicle compartment 11 is disposed inside the vehicle body 10. The vehicle body 10 has no roof. The vehicle compartment 11 is opened to the outside. The seats 13 are located in the vehicle compartment 11. The storage 4 is located below the seat 13 in the vehicle compartment 11. The storage 4 located below the seat 13 as described herein means that the storage 4 is located at a position lower than the seat 13 in a height direction, and specifies only a positional relationship between the storage 4 and the seat 13 in the height direction. That is, the storage 4 may project from the seat 13 in the front-rear direction or the vehicle width direction.

The vehicle body 10 has entrances 12 for the vehicle compartment 11. The entrances 12 are each located at right and left side surfaces of front and rear portions of the vehicle body 10. The entrances 12 on each side are defined by a front pillar 34, a center pillar 35, a rear pillar 36, and a side sill 37. Specifically, the entrance 12 at the front portion of the vehicle body 10 is defined by the front pillar 34, the center pillar 35, and the side sill 37. The entrance 12 at the rear portion of the vehicle body 10 is defined by the center pillar 35, the rear pillar 36, and the side sill 37. In this example, the vehicle body 10 has the plurality of doors 32 that open or close the entrances 12. The door 32 is disposed at each entrance 12. That is, the doors 32 are each located at the right and left at the front and rear portions of the vehicle body 10. The door 32 is opened, and accordingly, the entrance 12 is exposed. The door 32 is closed, and accordingly, the entrance 12 is closed. The door 32 is a so-called half door having no window frame. A front end portion of the door 32 is rotatably coupled to the vehicle body 10. The rotation axis of the door 32 extends substantially in the up-down direction.

The seats 13 are each located at the right and left at front and rear portions in the vehicle compartment 1. The seat 13 is adjacent to a corresponding one of the entrances 12 in the right-left direction. That is, the front left seat 13 is adjacent to the front left entrance 12. The same also applies to the other seats 13. The front left seat 13 is a driver's seat.

Figure 3:
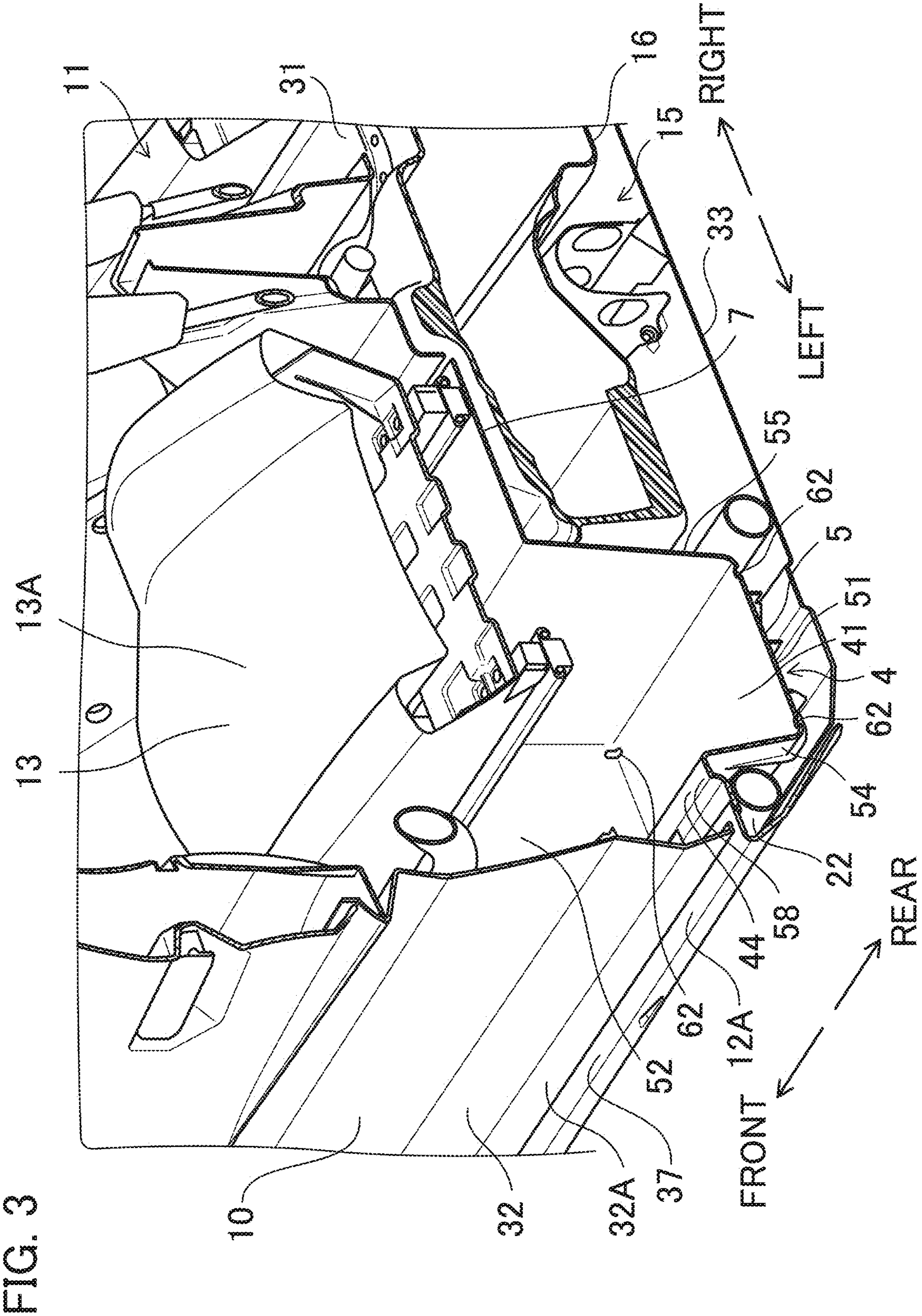
FIG. 3 is a perspective sectional view of part of the utility vehicle.

FIG. 3 is a perspective sectional view of part of the utility vehicle 100. The vehicle body 10 further has an underguard 33 located below the vehicle compartment 11. The underguard 33 defines a lower surface of the vehicle body 10. The underguard 33 protects components, equipment, etc. of the utility vehicle 100 from, e.g., a rock bounced on a ground surface while the utility vehicle 100 is traveling.

The vehicle body 10 further has a floor panel 31 which is a floor of the vehicle compartment 11. The underguard 33 is located below the floor panel 31. An equipment space 15 is located between the floor panel 31 and the underguard 33. The equipment space 15 is one example of a space below the vehicle compartment 11. The equipment is located in the equipment space 15. The equipment includes, for example, a fuel tank 16 and a battery. In the equipment space 15, the fuel tank 16 is located below the front seats 13 substantially at the center in the vehicle width direction. The equipment and the floor panel 31 are covered with the underguard 33 from below.

Figure 4:
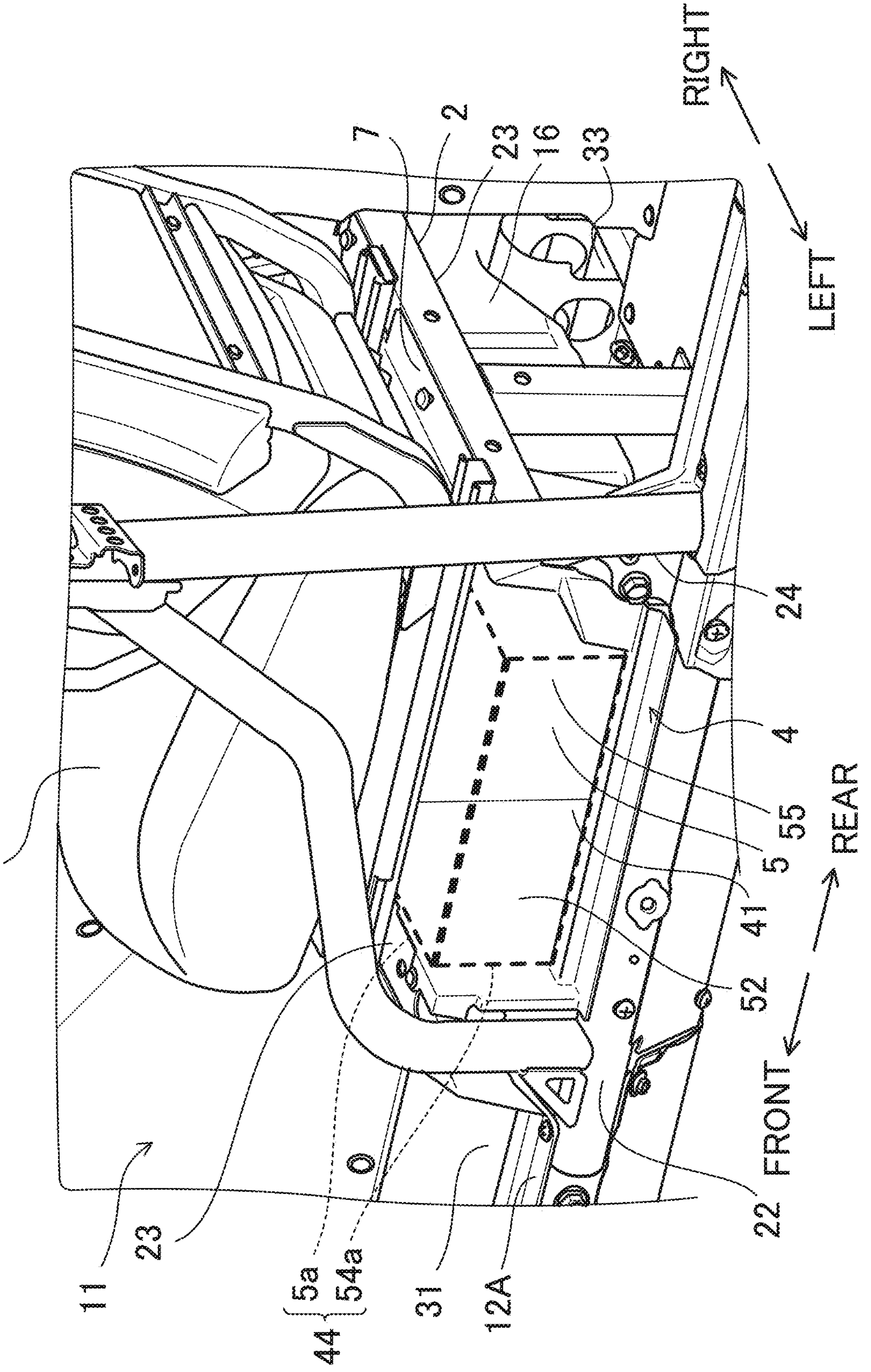
FIG. 4 is a perspective view of part of the utility vehicle without part of a floor panel and the door shown in the figure.
Figure 5:
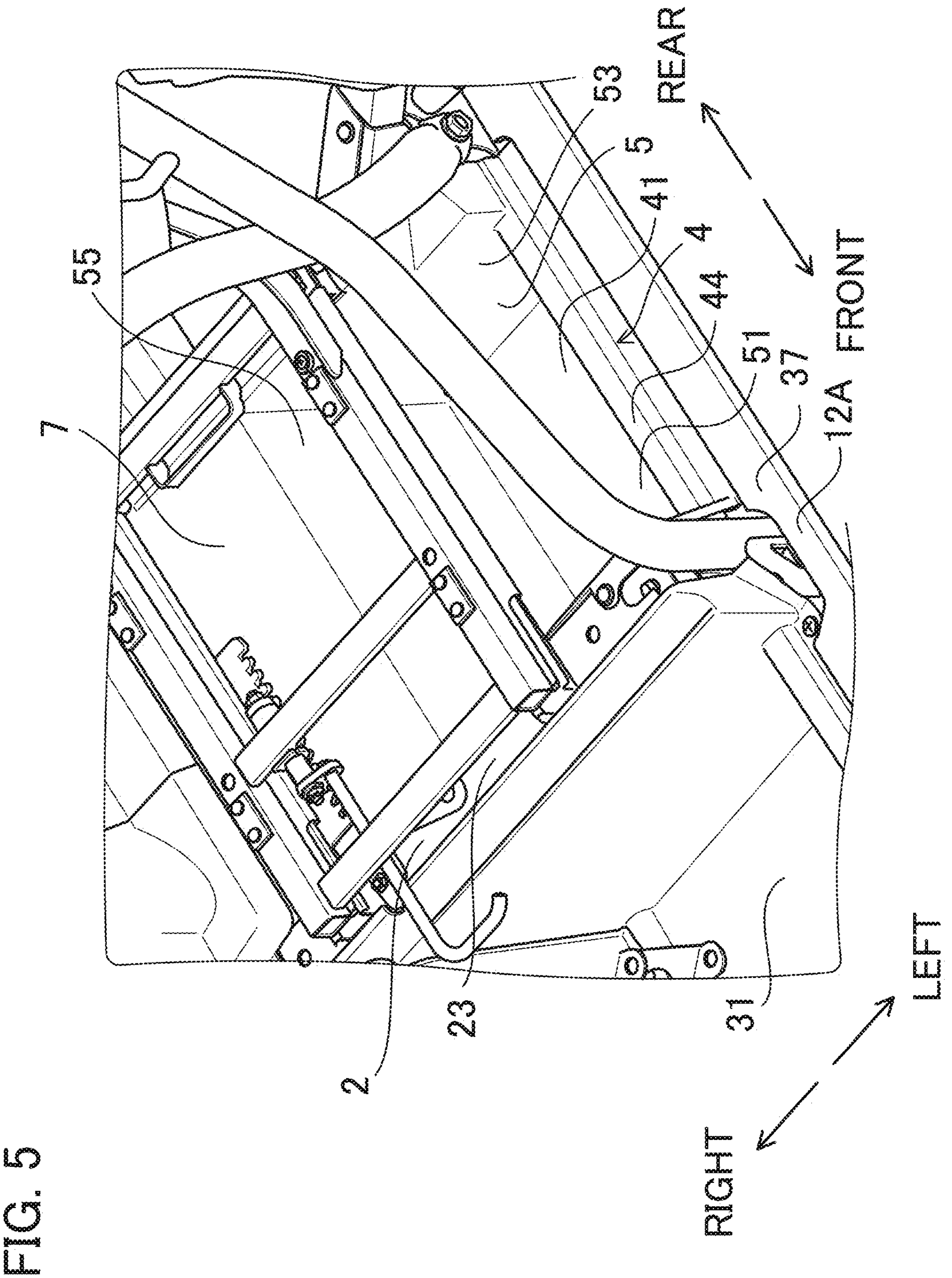
FIG. 5 is a perspective view of part of the utility vehicle without the door and a seat shown in the figure.

FIG. 4 is a perspective view of part of the utility vehicle 100 without part of the floor panel 31 and the door 32 shown in the figure. FIG. 5 is a perspective view of part of the utility vehicle 100 without the door 32 and the seat 13 shown in the figure. Note that a dashed line in FIG. 4 is a virtual line roughly showing the area of each of a side opening **54*a* and an upper opening 5*a* as described later. The vehicle body 10 further has a frame 2 which is a framework of the vehicle body 10. The frame 2 is, for example, formed of a steel pipe. For example, the frame 2 includes side frames 22, seat frames 23, and a roll over protective structure (ROPS) 24**.

The side frames 22 are each located at the right and left of the vehicle body 10. The side frame 22 extends substantially in the front-rear direction.

The seat frames 23 are located at each of the front and rear seats 13. A pair of seat frames 23 is located at the front seats 13. Each seat frame 23 extends substantially in the vehicle width direction. The pair of seat frames 23 is located with a clearance in the front-rear direction. The front left seat 13 and the front right seat 13 are attached to the pair of seat frames 23.

The ROPS 24 surrounds an upper portion of the vehicle compartment 11 to protect the vehicle compartment 11 upon, e.g., overturn of the utility vehicle 100.

The side frames 22 and the seat frames 23 are located in the equipment space 15. The side sill 37 is attached to the side frame 22.

In this example, the storage 4 is located below the front left seat 13. Hereinafter, the front left seat 13 will be merely referred to as a "seat 13A." The front left entrance 12 adjacent to the seat 13A will be merely referred to as an "entrance 12A." The front left door 32 that opens or closes the entrance 12A will be merely referred to as a "door 32A."

The storage 4 has a housing space 41 therein. In the housing space 41, goods such as a tool, gloves, and a flashlight are housed. The storage 4 has an access opening 44 opened to the entrance 12A such that the housing space 41 is accessible from the entrance 12A.

Specifically, the storage 4 is part of a partition dividing the vehicle compartment 11 and the equipment space 15 from each other. That is, the vehicle compartment 11 and the equipment space 15 are divided by the floor panel 31 and the storage 4. The storage 4 has a housing box 5 defining the housing space 41 and a partition plate 7 extending from the housing box 5 and not defining the housing space 41. The partition plate 7 is used for attaching the storage 4 to the vehicle body 10 and dividing the vehicle compartment 11 and the equipment space 15 from each other. The partition plate 7 is located inside with respect to the housing box 5 in the vehicle width direction. The housing box 5 and the partition plate 7 are made of synthetic resin.

The housing box 5 is a box opened upward. The housing box 5 is in a quadrangular shape as viewed in plane. Specifically, the housing box 5 has a bottom plate 51, a front plate 52, a rear plate 53, an outer plate 54, and an inner plate 55. The bottom plate 51 has such a rectangular outer shape that a longitudinal direction thereof is coincident with the front-rear direction. The front plate 52 extends upward from a front edge of the bottom plate 51. The rear plate 53 extends upward from a rear edge of the bottom plate 51. The front plate 52 and the rear plate 53 are aligned substantially in the front-rear direction. The outer plate 54 extends upward from an outer edge of the bottom plate 51 in the vehicle width direction, i.e., a left edge of the bottom plate 51. The inner plate 55 extends upward from an inner edge of the bottom plate 51 in the vehicle width direction, i.e., a right edge of the bottom plate 51. The outer plate 54 and the inner plate 55 are aligned substantially in the vehicle width direction. The outer plate 54 is connected to each of the front plate 52 and the rear plate 53. The inner plate 55 is connected to each of the front plate 52 and the rear plate 53.

A space surrounded by the bottom plate 51, the front plate 52, the rear plate 53, the outer plate 54, and the inner plate 55 is the housing space 41. The bottom plate 51 defines a lower portion of the housing space 41. The front plate 52 defines a front portion of the housing space 41. The rear plate 53 defines a rear portion of the housing space 41. The outer plate 54 defines an outer portion of the housing space 41 in the vehicle width direction. The inner plate 55 defines an inner portion of the housing space 41 in the vehicle width direction. The housing space 41 is recessed lower than a lower end of the entrance 12A, i.e., the side sill 37. Further, the housing space 41 is recessed lower than the floor panel 31.

The partition plate 7 is integrated with the housing box 5. The partition plate 7 extends inward, i.e., rightward, in the vehicle width direction from an upper edge of the inner plate 55. The partition plate 7 expands substantially in the horizontal direction.

The storage 4 has drain holes 62 that cause the housing space 41 and the outside thereof to communicate with each other. In this example, the drain holes 62 are each located at four corners of a lower end portion of the housing box 5. Each of two front drain holes 62 is a through-hole extending from the bottom plate 51 to the front plate 52. Each of two rear drain holes 62 is a through-hole extending from the bottom plate 51 to the rear plate 53. The drain hole 62 is for discharging water having entered the housing space 41 to the equipment space 15 outside the housing space 41.

The storage 4 is attached only to a member other than the underguard 33, and is located apart from the underguard 33 on the upper side thereof. The storage 4 covers at least part of the fuel tank 16. Specifically, the housing box 5 is located outside, i.e., the left side, with respect to the fuel tank 16 in the vehicle width direction. The inner plate 55 is located outside with respect to the fuel tank 16 in the vehicle width direction, and is adjacent to the fuel tank 16. The inner plate 55 covers part of the fuel tank 16 from the outside in the vehicle width direction. The outer plate 54 is, outside with respect to the fuel tank 16 in the vehicle width direction, located apart from the fuel tank 16, and is located near the entrance 12A. The outer plate 54 is adjacent to the left side frame 22 and the left side sill 37. The outer plate 54 is attached to the side frame 22. The front plate 52 is attached to the front seat frame 23 of the pair of seat frames 23. The rear plate 53 is attached to the rear seat frame 23 of the pair of seat frames 23. The bottom plate 51 is located apart from the underguard 33 on the upper side thereof. The bottom plate 51 is located lower than the lower end of the entrance 12A. The partition plate 7 is located above the fuel tank 16. The partition plate 7 covers part of the fuel tank 16 from above. The partition plate 7 is attached to the pair of seat frames 23.

The storage 4 is positioned substantially below the seat 13A. Specifically, in the front-rear direction, the front plate 52 is located at the substantially same position as that of a front end of a seat bottom of the seat 13A and the rear plate 53 is located at the substantially same position as that of a rear end of the seat bottom of the seat 13A, as shown in FIG. 4. In the right-left direction, an inner edge, i.e., a right edge, of the partition plate 7 in the vehicle width direction is located at the substantially same position as that of an inner edge, i.e., a right edge, of the seat bottom of the seat 13A in the vehicle width direction, as shown in FIG. 3. The outer plate 54 is located outside with respect to an outer edge, i.e., a left edge, of the seat bottom of the seat 13A in the vehicle width direction. The inner plate 55 is located right below the seat bottom of the seat 13A.

The access opening 44 is located at a relatively-upper outer portion of the storage 4 in the vehicle width direction.

Specifically, the side opening 54*a* opening to the outside in the vehicle width direction is located at an upper portion of the outer plate 54. An upper edge of the front plate 52 and an upper edge of the rear plate 53 are positioned substantially at the same height. The upper edge of the outer plate

54 is positioned lower than the upper edge of the front plate 52 and the upper edge of the rear plate 53. The side opening 54*a* is defined at least by the upper edge of the outer plate 54, an upper portion of a left edge of the front plate 52, and an upper portion of a left edge of the rear plate 53. The upper edge of the outer plate 54, i.e., a lower end of the side opening 54*a*, is located higher than the bottom plate 51.

The side opening 54*a* is connected to the upper opening 5*a* located at an upper portion of the housing box 5. At the upper portion of the housing box 5, the upper opening 5*a* is defined by the upper edge of the front plate 52, the upper edge of the rear plate 53, and the upper edge of the inner plate 55. The upper opening 5*a* is partially covered with the seat 13A. An outer portion of the upper opening 5*a* in the vehicle width direction is exposed to the outside without covered with the seat 13A. The side opening 54*a* and the exposed outer portion of the upper opening 5*a* in the vehicle width direction are connected to each other in the form of a single opening. Such an opening is the access opening 44. The access opening 44 is opened at least to the outside in the vehicle width direction. In this example, the access opening 44 expands upward from the housing space 41, and is also opened to above. A lower end of the access opening 44, i.e., the lower end of the side opening 54*a*, is located substantially at the same height as that of the lower end of the entrance 12A.

In the front-rear direction, the access opening 44 is located substantially at the same position as that of the entrance 12A. More specifically, in the front-rear direction, the access opening 44 is located inside with respect to the entrance 12A. Thus, when the door 32A is opened, the entrance 12A is exposed to the outside of the vehicle, and the access opening 44 is also exposed to the outside of the vehicle. A user opens the door 32A to open the entrance 12A, thereby accessing the housing space 41 from the outside of the vehicle through the entrance 12A and the access opening 44 and taking the goods in or out of the housing space 41. As described above, the door 32A is opened so that an access to the housing space 41 of the storage 4 below the seat 13A can be made without the need for moving the seat 13A. As a result, the use can easily use the storage 4.

On the other hand, in a case where the entrance 12A is closed with the door 32A, the access opening 44 is covered with the door 32A. That is, the door 32A in a closed state faces the access opening 44, and covers the access opening 44 from the outside in the vehicle width direction. In this example, the door 32A does not hermetically close the access opening 44, and there is a clearance between the door 32A and an edge of the access opening 44. However, such a clearance is small. That is, the door 32A covers the access opening 44 to such an extent that the goods do not come out of the housing space 41 in the vehicle width direction. During traveling, the goods in the housing space 41 might move due to vibration of the vehicle body 10. Since the door 32A is closed during traveling, the access opening 44 is covered with the door 32A during traveling. This prevents the goods from coming out of the access opening 44 during traveling. Moreover, during traveling, entrance of dirt, mud, etc. outside the vehicle into the housing space 41 is prevented by the door 32A.

The door 32A substantially functions as a lid for the access opening 44. Thus, the configuration of the storage 4 can be simplified. Further, the goods are often taken in or out of the housing space 41 when an occupant gets on or off the vehicle. Conversely, the goods are less likely to be taken in or out while the occupant is in the vehicle. Since the access opening 44 is opened or closed by an operation of opening or closing the door 32A, the access opening 44 can be opened under a situation where a frequency of accessing the storage 4 is high and be closed under a situation where the frequency of accessing the storage 4 is low. With this configuration, convenience of the storage 4 is improved.

The bottom plate 51 of the storage 4, i.e., a lower end of the housing space 41, is positioned lower than the lower end of the entrance 12A. Thus, the housing space 41 can be expanded, and the capacity of the storage 4 can be increased. Further, since the lower end of the entrance 12A is positioned higher than the lower end of the housing space 41, the goods can be housed in the housing space 41 in a state in which the goods are less likely to come out of the vehicle through the entrance 12A.

Since the storage 4 functions as part of the partition dividing the vehicle compartment 11 and the equipment space 15 from each other, an increase in the number of members of the utility vehicle 100 can be suppressed. Specifically, the storage 4 includes, in addition to the housing box 5 defining the housing space 41, the partition plate 7 not defining the housing space 41. That is, not only the housing box 5 defining the housing space 41 but also the partition plate 7 not defining the housing space 41 function as part of the partition dividing the vehicle compartment 11 and the equipment space 15 from each other. Thus, the vehicle compartment 11 and the equipment space 15 can be divided by the storage 4 across a wide area. Accordingly, the floor panel 31 can be decreased in size.

The inner plate 55 of the storage 4 and the partition plate 7 cover part of the fuel tank 16 located in the equipment space 15. Thus, the storage 4 can be used as a cover that covers part of the fuel tank 16.

At the storage 4, the drain holes 62 that cause the housing space 41 and the outside thereof to communicate with each other are located. Thus, even if, e.g., rainwater or river water has entered the housing space 41, such water is discharged to the outside of the storage 4, such as the equipment space 15, through the drain holes 62. Consequently, water accumulation in the housing space 41 can be reduced.

The storage 4 is positioned above the underguard 33 located below the vehicle compartment 11. Thus, the underguard 33 can protect the storage 4 from, e.g., a rock bounced on a ground surface. Particularly, the storage 4 is located apart from the underguard 33 on the upper side thereof. Thus, even if impact is applied to the underguard 33, such impact is less likely to be transmitted to the storage 4. With this configuration, the storage 4 is further protected.

Other Embodiment

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form anew embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

The off-road vehicle is not limited to the utility vehicle 100, and may be, for example, an all terrain vehicle (ATV) or a tractor.

The shape, size, material, etc. of each element of the utility vehicle 100 are not limited. The number of seats 13, the number of entrances 12, and the number of doors 32 in the utility vehicle 100 are not limited.

The door 32A may be a so-called full door having a window frame. The door 32A may be omitted. In this case, the housing space 41 of the storage 4 may be constantly opened to the outside of the vehicle through the entrance 12A. The door 32 may hermetically close the access opening 44 when the entrance 12 is closed.

The storage 4 may be located below the seat 13 other than the driver's seat. Since the storage 4 is located below the front left seat 13A in description above, the access opening 44 is opened to the left side. In a case where the storage 4 is located below the right seat 13, the access opening 44 is opened to the right side that is the outside in the vehicle width direction.

Attachment of the storage 4 is not limited to that in description above. The storage 4 may be attached to a portion of the frame 2 other than the seat frame 23, or may be attached to a member other than the frame 2. Alternatively, the storage 4 may be attached to the underguard 33.

The space divided from the vehicle compartment 11 by the storage 4 is not limited to the equipment space 15. For example, the space divided from the vehicle compartment 11 by the storage 4 may be a space where no equipment is located, or may be a space outside the vehicle. Further, the storage 4 does not necessarily have a function of dividing the vehicle compartment 11 and the space therebelow from each other.

The storage 4 does not necessarily project outward from the seat 13 in the vehicle width direction. For example, an outer edge of the storage 4 in the vehicle width direction, i.e., the outer plate 54, may be located inside with respect to an outer edge of the seat 13 in the vehicle width direction.

The lower end of the housing space 41 may be at the same height as that of the lower end of the entrance 12A, or may be positioned higher than the lower end of the entrance 12A. The lower end of the access opening 44 of the storage 4 may be at the same height as that of the lower end of the housing space 41.

It may only be required that the access opening 44 is opened at least to the entrance 12A. For example, the storage 4 may have no upper opening 5*a*, and may have only the side opening 54*a*. An additional access opening may be located at least at one of the front plate 52 or the rear plate 53.

The storage 4 may further include a lid that opens or closes the access opening 44. In this case, the access opening 44 is not opened or closed by the door 32, but is opened or closed by the lid.

The technique of the present disclosure is summarized as follows.

[1] The utility vehicle (the off-road vehicle) 100 includes the seat 13 located adjacent to the entrance 12A in the vehicle compartment 11, and the storage 4 located below the seat 13 and having the housing space 41 therein. The storage 4 has the access opening 44 opened to the entrance 12A such that the housing space 41 is accessible from the entrance 12A.

According to this configuration, the user can access the housing space 41 from the entrance 12A through the access opening 44 without the need for moving the seat 13A located above the storage 4. Thus, the user can easily access the housing space 41, and can easily use the storage 4.

[2] In the utility vehicle 100 of [1], the utility vehicle 100 further includes the door 32A that opens or closes the entrance 12A. The access opening 44 is covered with the closed door 32A.

According to this configuration, the door 32A can prevent the goods housed in the housing space 41 from coming out of the vehicle, and can prevent the goods housed in the housing space 41 from being gotten dirty with dirt, mud, etc. outside the vehicle. In addition, the door 32A that opens or closes the entrance 12A can be used as the lid for the storage 4, and therefore, the configuration of the storage 4 can be simplified.

[3] In the utility vehicle 100 of [1] or [2], the storage 4 is part of the partition that divides the vehicle compartment 11 and the equipment space (the space) 15 therebelow from each other.

According to this configuration, the storage 4 also serves as part of the partition that divides the vehicle compartment 11 and the equipment space 15 from each other, and therefore, an increase in the number of members of the utility vehicle 100 can be suppressed.

[4] In the utility vehicle 100 of any one of [1] to [3], the storage 4 has the housing box 5 defining the housing space 41 and the partition plate 7 extending from the housing box 5 and not defining the housing space 41.

According to this configuration, the storage 4 has, in addition to the housing box 5 defining the housing space 41, the partition plate 7 not defining the housing space 41 and extending from the housing box 5. Thus, the vehicle compartment 11 and the equipment space 15 can be divided by the storage 4 across a wide area.

[5] In the utility vehicle 100 of any one of [1] to [4], the fuel tank 16 is located in the equipment space (the space) 15, and the storage 4 covers part of the fuel tank 16.

According to this configuration, the storage 4 can be used as the cover that covers part of the fuel tank 16.

[6] In the utility vehicle 100 of any one of [1] to [5], the utility vehicle 100 further includes the underguard 33 located below the vehicle compartment 11. The storage 4 is located apart from the underguard 33 on the upper side thereof.

According to this configuration, the underguard 33 can protect the storage 4 from, e.g., a rock bounced on a ground surface. Even if impact is applied to the underguard 33, such impact is less likely to be transmitted to the storage 4, and therefore, the storage 4 can be further protected.

[7] In the utility vehicle 100 of any one of [1] to [6], the storage 4 has the drain hole 62 that causes the housing space 41 and the outside thereof to communicate with each other.

According to this configuration, water having entered the housing space 41 is discharged to the outside of the housing space 41 through the drain hole 62. Thus, water is less likely to be accumulated in the housing space 41.

What is claimed:

1. An off-road vehicle comprising:

a seat located adjacent to an entrance in a vehicle compartment; and a storage for goods or baggage located below the seat and including:

a housing space therein; and an access opening opened upward and to an outside in a vehicle width direction such that the housing space is accessible from the entrance, wherein the housing space is recessed lower than a lower end of the entrance.

2. An off-road vehicle comprising:

a seat located adjacent to a user entrance for a vehicle compartment;

a storage located below the seat and including:

a housing space therein; and an access opening opened to the entrance such that the housing space is accessible from the entrance; and a door that opens or closes the entrance, wherein the access opening is covered with the closed door and is not covered with any member other than the closed door.

3. The off-road vehicle of claim 2, wherein the storage is part of a partition that divides the vehicle compartment and a space therebelow from each other.

4. The off-road vehicle of claim 3, wherein the storage further includes a housing box defining the housing space and a partition plate extending from the housing box and not defining the housing space.

5. The off-road vehicle of claim 3, wherein a fuel tank is located in the space, and the storage covers part of the fuel tank.

6. The off-road vehicle of claim 1, further comprising:

an underguard located below the vehicle compartment, wherein the storage is located apart from the underguard on an upper side thereof.

7. The off-road vehicle of claim 1, wherein the storage further includes a drain hole that causes the housing space and an outside thereof to communicate with each other.

8. The off-road vehicle of claim 1, wherein the storage further includes a housing box defining the housing space and including an upper opening, the housing box includes a bottom plate defining a lower portion of the housing space and an outer plate defining an outer portion of the housing space in the vehicle width direction, the outer plate includes a side opening opened to an outside in the vehicle width direction, located at an upper end of the outer plate and connected to the upper opening, and the upper opening and the side opening are the access opening.

9. An off-road vehicle comprising:

a seat located adjacent to an entrance in a vehicle compartment; and a storage for goods or baggage located below the seat and including a housing space therein, wherein the storage further includes:

an access opening opened to the entrance such that the housing space is accessible from the entrance; and a housing box defining the housing space and including an upper opening, the housing box includes a bottom plate defining a lower portion of the housing space and an outer plate defining an outer portion of the housing space in a vehicle width direction, the outer plate has a side opening opened to an outside in the vehicle width direction, located at an upper end of the outer plate and connected to the upper opening, and the upper opening and the side opening are the access opening.

* * * * *